United States Patent
Bergelin et al.

(10) Patent No.: US 11,953,422 B2
(45) Date of Patent: Apr. 9, 2024

(54) METHOD AND APPARATUS FOR DETECTING CORROSION

(71) Applicant: ÅBO AKADEMI UNIVERSITY, Turku (FI)

(72) Inventors: Mikael Bergelin, Åbo (FI); Janne Lahtiranta, Lieto (FI); Juho Lehmusto, Åbo (FI); Berndt Södergård, Åbo (FI)

(73) Assignee: ÅBO AKADEMI UNIVERSITY, Turku (FI)

( * ) Notice: Subject to any disclaimer, the term of this patent is extended or adjusted under 35 U.S.C. 154(b) by 195 days.

(21) Appl. No.: 17/779,822

(22) PCT Filed: Nov. 25, 2020

(86) PCT No.: PCT/FI2020/050796
§ 371 (c)(1),
(2) Date: May 25, 2022

(87) PCT Pub. No.: WO2021/105563
PCT Pub. Date: Jun. 3, 2021

(65) Prior Publication Data
US 2023/0011245 A1    Jan. 12, 2023

(30) Foreign Application Priority Data

Nov. 27, 2019 (FI) .................... 20196024

(51) Int. Cl.
*G01N 17/02* (2006.01)
*G01N 17/00* (2006.01)

(52) U.S. Cl.
CPC ........... *G01N 17/02* (2013.01); *G01N 17/006* (2013.01); *G06F 2218/12* (2023.01)

(58) Field of Classification Search
CPC ...... G01N 17/02; G01N 17/006; G01N 27/30; G01N 27/42; G01N 27/48; G01N 33/20; G01N 27/3277; G06F 2218/12
See application file for complete search history.

(56) References Cited

U.S. PATENT DOCUMENTS

| 4,294,667 A | 10/1981 | Yamamoto et al. |
| 5,795,461 A | 8/1998 | Rising |
| 6,264,824 B1 | 5/2001 | Reid et al. |
| 8,926,823 B2 * | 1/2015 | Kipouros ............... G01N 17/02 204/404 |

(Continued)

FOREIGN PATENT DOCUMENTS

| CN | 106442682 | 2/2017 |
| GB | 2048491 | 12/1980 |

(Continued)

OTHER PUBLICATIONS

Aug. 1, 2023 Office Action issued in Japanese Patent Application No. 2022-531004, pp. 1-3 [machine translation included].

(Continued)

*Primary Examiner* — Alvaro E Fortich
(74) *Attorney, Agent, or Firm* — Nixon & Vanderhye PC (57) ABSTRACT

A method and apparatus of detecting incipient corrosion on surfaces of an object. The method comprising immersing the object into an electrolyte, and detecting by electrochemical techniques the presence of corrosion on the surfaces of the object based on current originating from redox reaction of iron.

13 Claims, 5 Drawing Sheets

(56) References Cited

U.S. PATENT DOCUMENTS

| | | | |
|---|---|---|---|
| 2007/0039833 A1* | 2/2007 | Lin | G01N 27/48 |
| | | | 205/775 |
| 2007/0163892 A1* | 7/2007 | Haridas | G01N 17/04 |
| | | | 204/404 |
| 2008/0179198 A1 | 7/2008 | Burgess et al. | |
| 2009/0096471 A1* | 4/2009 | Eden | G01N 17/04 |
| | | | 324/700 |
| 2010/0000879 A1 | 1/2010 | Hladky et al. | |
| 2015/0185133 A1 | 7/2015 | Murray | |
| 2015/0204775 A1* | 7/2015 | Shukla | G01N 17/04 |
| | | | 702/57 |
| 2019/0204210 A1 | 4/2019 | Gervasio et al. | |

FOREIGN PATENT DOCUMENTS

| | | |
|---|---|---|
| JP | 2001-033389 | 2/2001 |
| JP | 2003-149198 | 5/2003 |
| JP | 2012-233819 | 11/2012 |

OTHER PUBLICATIONS

Katsumi Masamura, "Reference Electrodes", Boshoku Gijutsu, Vo.35, No. 7, pp. 422-423 (1986).

International Report on Patentability for PCT/FI2020/050796 dated Mar. 2, 2022 (27 pages).

Written Opinion of the ISA for PCT/FI2020/050796, dated Apr. 29, 2021 (10 pages).

International Search Report for PCT/FI2020/050796, dated Apr. 29, 2021 (6 pages).

Fusco, M. et al., "Corrosion of single layer thin film protective coatings on steel substrates for high level waste containers" Progress in Nuclear Energy, Feb. 27, 2016, vol. 89, pp. 159-169 (12 pages).

Mabbutt, S. et al., "Review of Artificial Neural Networks (ANN) applied to corrosion monitoring" Journal of Physics: Conference Series. May 28, 2012, vol. 364, No. 1, pp. 1-7 (7 pages).

Kamrunnahar, M. et al., "Prediction of corrosion behavior using neural network as a data mining tool" Corrosion Science, Mar. 1, 2010, vol. 52, No. 3, pp. 669-667 (10 pages).

Corbett, R. "Laboratory Corrosion Testing of Medical Implants" Materials & Processes for Medical Devices Conference, 2003 (6 pages).

Kay, L. "Cyclic Potentiodynarnic Survey of Medical Materials" IPFW, Department of Manufacturing & Construction Engineering Technology and Interior Design, Dec. 2010 (101 pages).

Search Report for Finish Patent Application 20196024, dated Jun. 6, 2020 (2 pages).

* cited by examiner

METHOD AND APPARATUS FOR DETECTING CORROSION

This application is the U.S. national phase of International Application No. PCT/FI2020/050796 filed Nov. 25, 2020 which designated the U.S. and claims priority to FI 20196024 filed Nov. 27, 2019, the entire contents of each of which are hereby incorporated by reference.

FIELD OF THE INVENTION

The present invention relates to the detection of corrosion, and more particularly to detection of corrosion using electrochemical techniques.

BACKGROUND OF THE INVENTION

Corrosion of medical instruments and objects is an everyday phenomenon in hospital environments, for example. It originates, for instance, from residues such as body fluids, which provide an ideal growth substrate for various microbes that might start deteriorating the surface in question through corrosion.

An essential hygienic step in the cleaning of reusable medical instruments is sterilization by high-temperature steam. However, should the corrosion has already initiated, the instrument needs to be cleaned manually before the sterilization. If not properly cleaned, iron oxides present on the surfaces will contaminate the whole batch of instruments being sterilized.

The present state-of-art detection of incipient corrosion is based on machine vision, which has several shortcomings. Firstly, many aging objects develop darker passivation layer spots, which give rise to a high number of false positives. Secondly, as any visual means of detection is only capable of evaluating surfaces in the field of view, corrosion in "hidden places" such as hinges of clamps, or in the inner sides of structures, such as stents and tubes, cannot be evaluated reliably with existing techniques.

In disclosure U.S. Pat. No. 6,264,824 B1 corrosion of an object is detected with an electrochemical procedure and more specifically using electrochemical noise measurement. In the disclosure, the corrosion is detected based on corrosion current and the corrosion process is thereby ongoing.

BRIEF DESCRIPTION OF THE INVENTION

An object of the present invention is to provide a method and an apparatus for implementing the method so as to overcome the above problem relating to detecting corrosion on instruments with complex geometries. The object of the invention is achieved by a method and an apparatus which are characterized by what is stated in the independent claims. The preferred embodiments of the invention are disclosed in the dependent claims.

The invention is based on the idea of utilization of electrochemical techniques to enable an analysis of all exposed surfaces. The inspected object is immersed in an electrolyte, and a current response can be used for detecting the corrosion. Electrochemical techniques enable to obtain an indication of corrosion even if the corrosion is not visible. Further, with electrochemical techniques, very small amounts of corrosion products on a large non-corroded surface can be detected which would be hard to detect with known methods and devices which are based on visual inspection. Even further, the invention enables to detect corroded surfaces and does not require that the corrosion process is ongoing.

The method and apparatus of the invention are able to provide accurate results with minimal false-positive results. The method does not react to harmless surface alterations and alerts the user only when the presence of iron oxide species is detected.

The invention further enables to inspect objects with complex forms without losing the accuracy of the inspection and without harming or destroying the inspected objects as the corrosion current is not flowing. The inspection provides reliable results in connection with non-visible internal structures. The invention can also be applied to various automated quality control processes.

BRIEF DESCRIPTION OF THE DRAWINGS

In the following, the invention will be described in greater detail by means of preferred embodiments with reference to the accompanying drawings, in which.

DETAILED DESCRIPTION OF THE INVENTION

Small patches of iron oxides on the surface of medical implements has been found to be detectable by electrochemical techniques, such as by means of linear sweep voltammetry (LSV) and/or cyclic voltammetry (CV) in a relevant potential window, for instance between −0.35 V and 0.35 V vs Ag/AgCl reference. Linear sweep voltammetry (LSV) and cyclic voltammetry (CV) are procedures that are known as such and are commonly used to study the properties of electrolysis processes.

In the present invention, the object to be inspected is immersed in an electrolyte and the presence of corrosion products on the surfaces of the object is detected by electrochemical techniques based on the current originating from the redox reaction of iron. The object to be inspected may comprise one or multiple medical instruments, for example. The electrochemical techniques include linear sweep voltammetry (LSV) and cyclic voltammetry (CV). With LSV or CV, a sweeping voltage is provided in an electrode and a current response is detected. Based on the current response it can be concluded whether corrosion has occurred on the surface of the inspected object. The corrosion on the surface of the inspected object may be due to the corrosion process that has brought iron oxides to the surface or the iron oxides may be due to contact with other corroded objects, for example. The presence of corrosion which is detected with the invention does not require that the corrosion process is ongoing as the detection is based on the redox reaction of the iron in iron oxide and more specifically on the electrical current originating from the redox reaction.

The voltage sweep rate should be selected to be preferably in the range between 5 mV/s and 100 mV/s to facilitate identification of the surface reactions, i.e. the presence of iron(oxides). In LSV or CV procedures a sweeping voltage is applied between the electrodes and a current response is measured. As the object or multiple of objects to be inspected which acts as one of the electrodes may have a large surface area, the capacitive current is prevailing. If the inspected object has corrosion, i.e. iron(oxides), the current response to the sweeping voltage displays an alteration of the signal in a certain voltage area. The current is due to the redox conversion between two charge states of iron, the corresponding electron transfer through the external circuit and the ionic charge balancing. More specifically, the two states of iron are $Fe^{2+}$ and $Fe^{3+}$, and the detected current is due to the transfer of electrons between these two states.

By complete immersion of the inspected objects, such as medical tools, medical instruments, clinical research instruments, clinical instruments, components, spare parts, or any metallic pieces, into a suitable electrolyte, contact between the detecting medium and point of corrosion can be ensured as the electrolyte is in connection with the object no matter what the shape of the object is. A suitable electrolyte is, for example, a synthetic physiological fluid which is also known as IV-fluid. In the method, an electrochemical reaction is obtained using a setup, in which the electrolyte is preferably the IV fluid. Further, the inspected objects in the electrolyte are acting as a working electrode and an electrolyte vessel acts as a counter electrode. Further, a reference electrode is provided to complete the required three-electrode setup. The third electrode is preferably an Ag/AgCl reference electrode. Such a reference electrode is suitable as the physiological fluid is used as an electrolyte is sufficiently high in chloride content. Ag/AgCl reference electrode has been found to be a suitable reference electrode. However, other reference electrodes can also be employed without departing from the invention. The use of IV-fluid is also suitable as it is readily available in hospital environments, for example. Further, the properties of the fluid are not harmful to the instruments which are being scanned. Other suitable reference electrodes include calomel electrodes (SCE) and reversible hydrogen electrodes (RHE, SHE), for example. With different electrodes, a different electrolyte may have to be chosen. Further, the potential window in which the voltage change is carried out has to be adjusted according to the selected reference electrode in a known manner. Ag/AgCl reference electrode is preferred as the electrode is known to be stable and durable in the intended chemical surrounding. The electrolyte used in the invention is preferably a water-based electrolyte having salt (chloride) content. As mentioned, IV-fluid has the properties which are needed for the electrolyte.

It is important, that the used electrolyte does not react with intact surfaces so that the object from which the corrosion is detected is harmed.

As mentioned above, in the LSV or CV scan voltage is changed and current between the electrodes is measured. As the corroded surface is typically comparatively small with respect to the non-corroded or intact surface area, the obtained current originating from the electrolysis reaction is small. The current corresponding to the surface alteration being studied is obtained typically in a certain part of the voltage sweep, and the presence of current indicating the corrosion can be detected from the current response.

Figure 1:
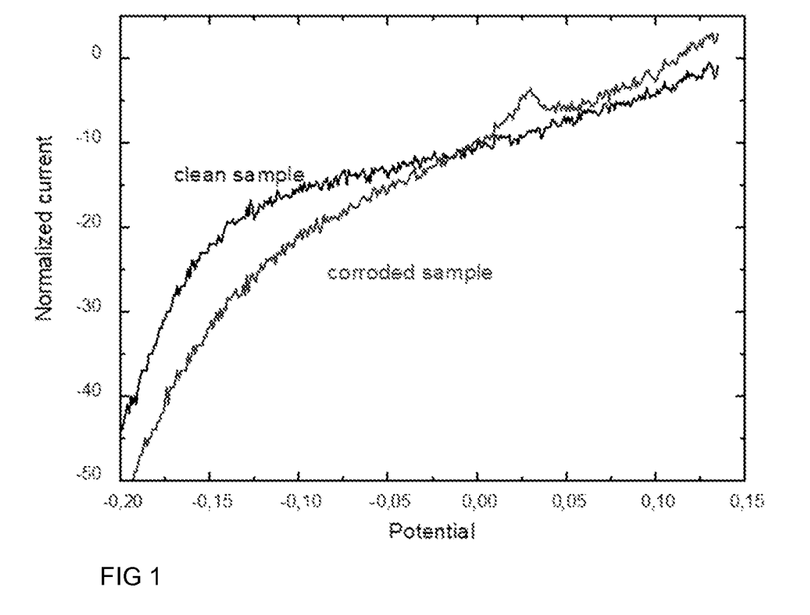
FIG. 1 shows current waveforms obtained with an embodiment of the invention.
Figure 2:
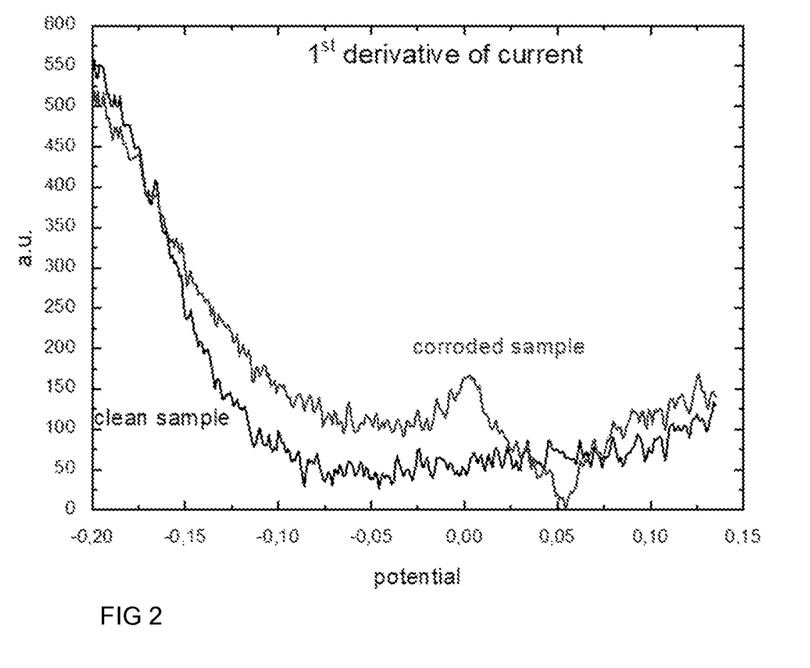
FIG. 2 shows the first derivative of current as a function of potential.

According to an embodiment of the invention, the current indicating corrosion is detected from the first or second derivative of the current. The first derivative of the current represents the change rate of current and the second derivative of the current represents the rate of the current change. When a voltage sweep is employed, the resulting current changes approximately linearly, i.e. it increases or decreases without any abrupt changes. This linear change is due to the capacitive current. However, in a certain voltage range, the current has an additional component originating from the redox conversion of iron species if these are present on the surface. This additional current component is indicative of the corrosion of the object. The current peak or an alteration in the current signal is detectable as such or from the first or the second derivative of the current. FIG. 1 shows an example of current as a function of potential both for a clean sample and for a corroded sample. The current peak is hardly visible in the current of the corroded sample of FIG. 1 at 0.25 Volts. FIG. 2 shows the derivatives of the currents of FIG. 1. It can be seen that a peak is more visible and thus more easily detectable in the derivative of the curve than in the original current waveform of FIG. 1. FIG. 2 also shows the waveform of the derivative of the clean sample of FIG. 1.

Figure 3:
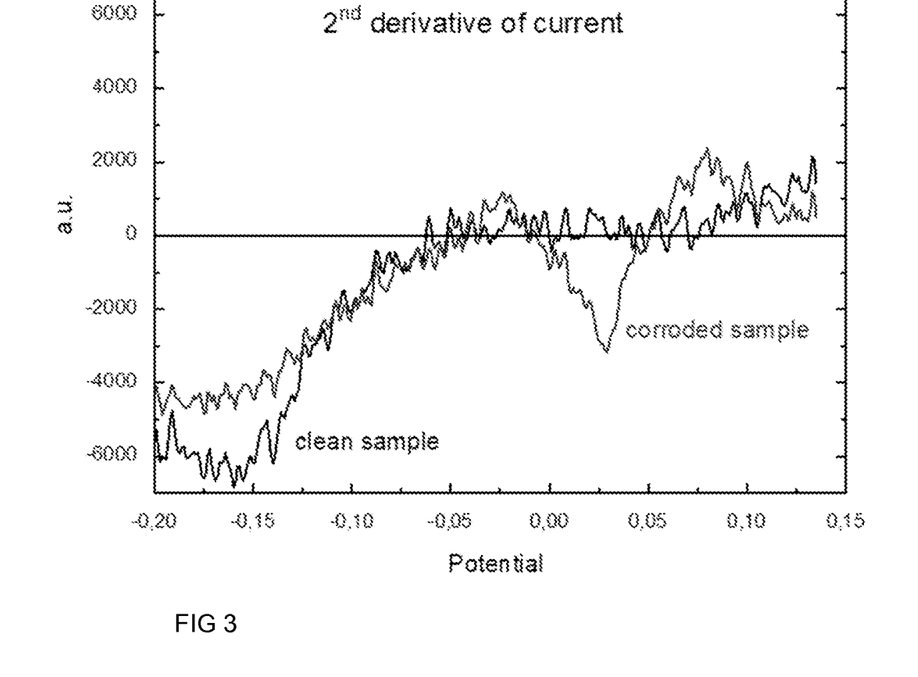
FIG. 3 shows the second derivative of current as a function of potential.

FIG. 3 further shows the second derivatives of the current response of FIG. 1. In FIG. 3 the second derivatives of both clean sample and corroded sample are shown. As can be seen, a clear and detectable peak is shown in the waveform of the corroded sample.

The detection of current from the redox conversion of iron species can be detected using circuitry in which the current is measured as digital samples or transformed into digital form. The digital representation of the current waveform can be subjected to mathematical calculation or transformations. These calculations may include using different filters for determining whether a current peak is present in the current response. Further, in a preferred embodiment, the first or the second derivative of the current is calculated. As the current is as digital samples, the first derivative and the second derivative of the current can be calculated using a suitable software algorithm. The value of the second derivative of the current can be used as an indication of whether corrosion is detected. It is, however, clear that the current originating from the redox reaction can be detected using other means which are able to analyse the current signal. The first or the second derivatives of the current can be determined with respect to time or potential.

Figure 4:
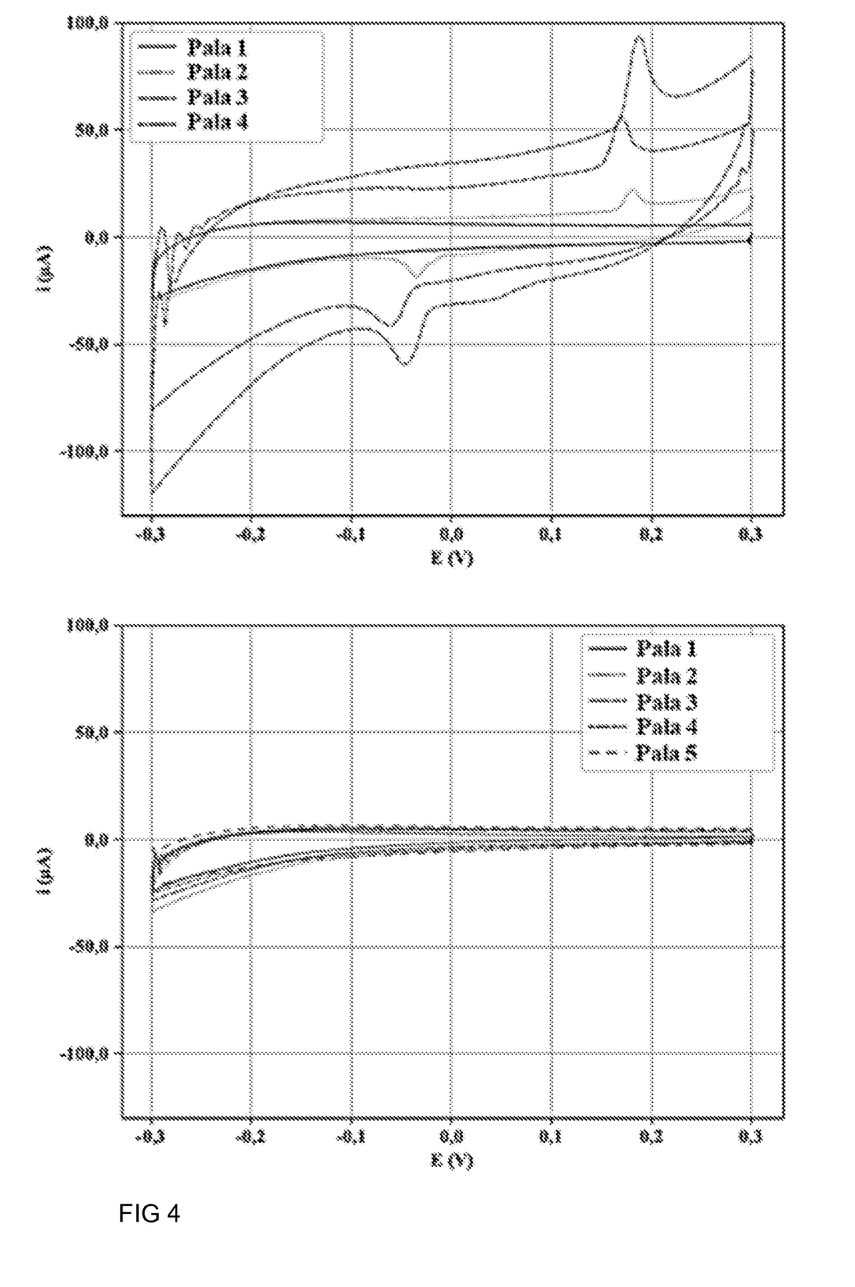
FIG. 4 shows current waveforms obtained with an embodiment of the invention.

FIG. 4 shows voltammograms which were obtained when the method of the invention was tested. The upper plot shows measurements which were carried out with corroded test pieces and the lower plot shows similar measurements with test pieces in which the surface is free of corrosion. The potential window in the tests is selected to be from −0.3V to 0.3V. It can be seen that upper plot with the corroded test piece shows an increase in the current when the sweeping voltage reaches approximately 0.18V. Further, a negative peak is visible when the voltage speed is negative at voltages −0.05V. When the voltage increases the positive current peak is due to oxidation of the iron and the negative current peak is due to reduction of the iron. As seen from the lower plot, the pieces which were not corroded did not show a current peak when tested according to the method.

In the method, the potential window used for the potential sweep can be selected to be from 0 V to 0.35V vs Ag/AgCl reference. Once potential is changed between these values, a current peak is obtained in the current response if corrosion is present. As described above, the current peak is positive and it is obtained when the current is increased.

It has been found out, that in the present method the negative peak due to the reduction of the iron can be detected more clearly than the positive peak. According to an embodiment, the detection of the iron oxides is carried out from the current when the voltage is reduced. Further, in an embodiment, the potential window in which the potential is changed is selected to be −0.25V to 0.1V when the reference electrode is an Ag/AgCl reference electrode. As mentioned above, when other reference electrodes are used, the potential window is changed accordingly. The negative peak or the positive peak refer generally to alteration in the current signal. The alteration in the current signal may detected also with other signal processing procedures than by detecting the peaks. Generally, the change of the current signal with respect to a clean sample may indicate the presence of iron oxides.

The potential window and the sweep rate are selected in such a manner, that the objects which are under inspection are not harmed. If, for example, the sweep rate is too high the current response associated with iron oxide alteration may go unnoticed, and if the potential window is too wide, the intact surfaces might get damaged. Thus the potential window and the sweep rate are preferably selected in such a manner, that the associated response is obtained only from a corroded surface, i.e. only when iron oxides are present.

Further, the number of the sweeps, that is the increase and decrease of potential, can have a selected maximum amount. Once a positive indication is found, the process is stopped. If a positive or uncertain indication is obtained, the sweeps are repeated for the set number of times at the maximum. Thus according to an embodiment, the measurement cycle, i.e. the voltage sweep, is repeated. The repeated measurement may be used for ensuring the correctness of the results.

The apparatus of the invention, which implements the method, comprises means for immersing the object into electrolyte and means for detecting by electrochemical techniques the presence of corrosion on the surfaces of the object based on current originating from redox reaction of iron.

Figure 5:
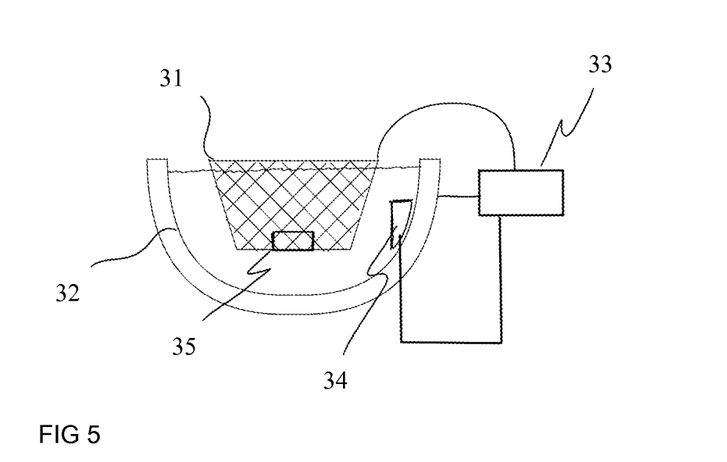
FIG. 5 shows a simplified structure of an embodiment of the invention.

FIG. 5 shows an example of an apparatus for implementing the method. According to an embodiment of the invention, the means for immersing the object 35 comprise a stainless steel member to which the objects to be inspected are connected electrically. The stainless steel member is preferably a stainless steel plate or a stainless steel mesh basket 31 in which the object or objects can be placed. The stainless steel member is electrically connected to the measurement circuitry 33 and the object 35 forms the working electrode of the system. The object is immersed into an electrolyte which is preferably held in a stainless steel vessel 32. The stainless steel vessel 32 acts as a counter electrode and is also connected to the measurement circuitry 33. The setup also comprises a reference electrode 34, which is preferably an Ag/AgCl reference electrode.

The means for detecting the presence of corrosion products comprise the measurement circuitry, which provides a pre-programmed LSV or CV scan. The dedicated measurement circuitry displays the functionality required to produce the LSV or CV scan at an accuracy and sensitivity sufficient for the detection process. For example, the accuracy of the voltage control should be better than 10 mV, the accuracy of the sweep rate should better than 2 mV/s and the sensitivity of the current measurement should be better than 1 μA. The accuracy of control and the sensitivity of the measurement allow detecting the current response reliably.

In addition to the measurement circuitry providing the scan, an embedded software algorithm or software installed on an external unit compares the obtained results, i.e. the current response, against a given set of criteria. For example, the comparison may compare the first or second derivative of the current in a specific potential window against a limit value. If the first or second derivative of the current exceeds the limit value, the measurement software produces an indication that the object has iron oxide on its surface (corrosion). On the other hand, if the second derivative of the current remains below the set limit value, the measurement circuitry produces an indication that corrosion was not found.

This information may be conveyed to the user simply by using suitable light indications and/or text information on a display visible to the user of the apparatus. Once the scan has ended, the user of the apparatus can remove the objects and proceed with them according to the obtained results.

In one aspect of the disclosure, machine learning is employed in detecting corrosion. Specifically supervised learning is employed in teaching the machine learning process. The procedure in the machine learning process comprises measuring and storing the current response for a selected voltage sweep.

The measuring and storing current response for a selected voltage sweep is carried out without the object. Thus only the used basket or similar is employed in a sweep. In the next step, the stored current response of the voltage sweep without the object is removed from the stored current response with the object. The stored current response with the object may be an average of multiple current responses with the same object. The above removal of current response may be carried out simply by subtracting the current values for obtaining prepared data.

Further, in the procedure relating to machine learning, a linear baseline is fitted to the prepared data from a certain potential point to a point of the certain minimum potential point. Further, the baseline is subtracted from the prepared data, and the remaining data is smoothed or filtered using a moving average filter, for example.

In the procedure, the slope of the baseline and the maximum point of the smoothed data are determined and stored. The slope and the maximum point are used as the data relating to machine learning. Each measurement is thus classified in a two-dimensional manner.

As supervised machine learning is employed, objects having corrosion on the surface and cleans objects are employed in the above procedure to obtain data which is used as a reference classification. Once classification data is gathered with the procedure, the procedure is used to determine whether the object has corrosion on its surface or the object is free from corrosion. The data obtained with the above procedure from actual samples are mapped with the reference data. Using the reference data the data obtained from the sample is classified with a classification method, such as a Nearest-Neighbor classification.

In the above procedure, the current samples are obtained using the measurement of the invention, i.e. current is measured using electrochemical techniques, such as LSV or CV.

Figure 6:
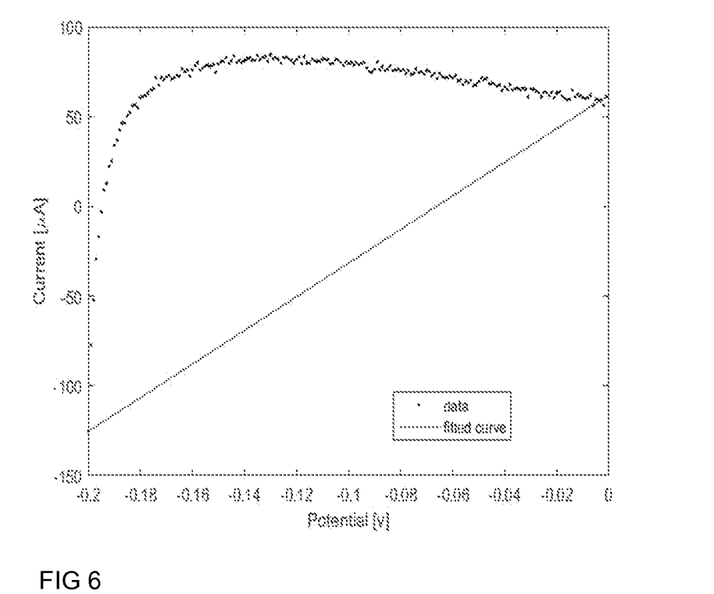
FIG. 6 shows another current waveform.

The above machine learning procedure is further described in connection with FIGS. 6, 7, and 8 which show examples of obtained data in visualized form. FIG. 6 shows an example of the prepared data mentioned above. The prepared data refers to measured current values during the voltage sweep from which the corresponding current values without any object (i.e. empty basket) is removed. The measured current values represent an average of three consecutive current measurements.

FIG. 6 also shows a baseline which is a fitted curve from the zero-potential point to point of the minimum potential. In the example shown in FIG. 6, the minimum potential is selected to be −0.2 Volts and the highest value of voltage is zero. The voltage in the measurement is swept from the negative side to zero to obtain the current values.

Figure 7:
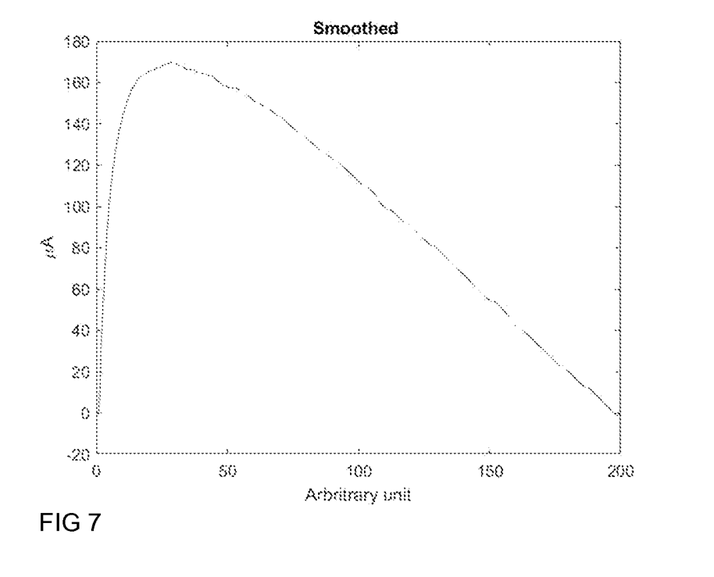
FIG. 7 shows a modification of the current waveform of FIG. 6.
Figure 8:
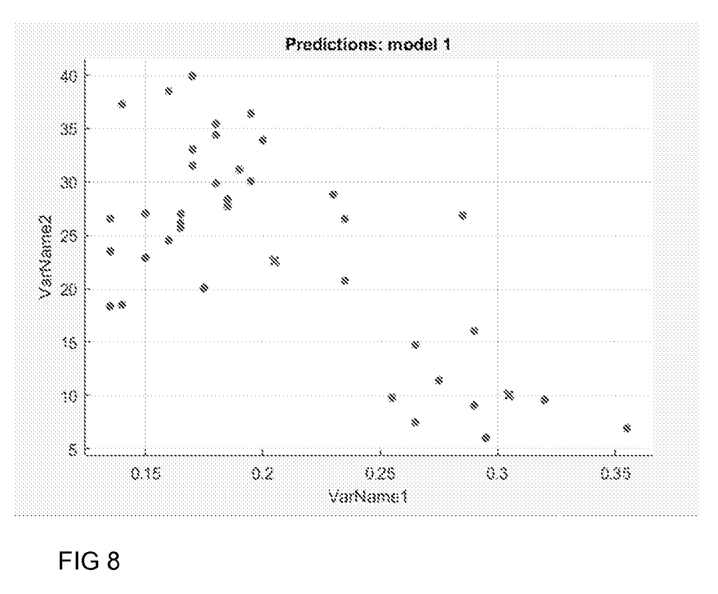
FIG. 8 shows a chart relating to machine learning.

Further, FIG. 7 shows a smoothed current curve in which the baseline of FIG. 6 is subtracted from the prepared data of FIG. 6. The slope of the baseline is calculated and the maximum point of the smoothed curve is determined to obtain data used in the classification. FIG. 8 shows an example of data that is gathered with known reference objects (with corrosion and without corrosion) together with data from the objects from which the corrosion is tested. Thus the amount of data used in the chart of FIG. 8 increases with every scanning procedure carried out.

As actual measurement data is placed in the chart, a certain procedure for determining whether the object to which the measurement data relates is clean or has experienced corrosion. The classification to clean or corroded may be carried out using Nearest-Neighbor classification, for example. In Nearest-Neighbor classification it is checked whether the nearest existing data point in the chart relates to a clean object or to an object having corrosion. As the amount of data in the chart of FIG. 8 increases, the classification of the object gets more accurate.

Thus according to an embodiment, the detecting of the presence of corrosion comprises determining the current response in a selected potential range. Determining from the current response data used in a machine learning procedure, the machine learning procedure comprising previously gathered data as described above. Further, the embodiment comprises classifying the object to a corroded sample or to a clean sample based on the determined data and from the previously gathered data using machine learning.

The above-described apparatus is an example of a possible structure with which the detection of corrosion can be carried out. Depending on the size of the object the mechanical structure of the apparatus may be different. It is also understandable, that as different objects have different shapes and sizes, the object is not necessarily inspected completely with one procedure or that only a part of an object is inspected. When an object is only partially immersed into an electrolyte, only the immersed portion of the object is inspected. However, when placing the object in the electrolyte in different orientations the complete surface of the object may be inspected using repeated procedures.

It will be obvious to a person skilled in the art that, as technology advances, the inventive concept can be implemented in various ways. The invention and its embodiments are not limited to the examples described above but may vary within the scope of the claims.

The invention claimed is:

1. A method of detecting corrosion on surfaces of an object, the method comprising
immersing the object into an electrolyte,
detecting by electrochemical techniques the presence of corrosion on the surfaces of the object based on current originating from redox reaction of iron, wherein the step of detecting comprises using linear sweep voltammetry (LSV) or cyclic voltammetry (CV) scan and using an Ag or an AgCl reference electrode in the LSV or CV scan as the third electrode, and wherein the potential window for the LCV or CV scan is between −0.35V and 0.35V vs Ag/AgCl reference.

2. A method according to claim 1, wherein in the LSV or CV scan is used to detect the presence of iron(oxides).

3. A method according to claim 1, wherein the object is of stainless steel alloy and acts as a working electrode.

4. A method according to claim 1, wherein the sweep rate of LSV or CV scan is in the range between 5 mV/s and 100 mV/s.

5. A method according to claim 1, wherein the potential window for the LCV or CV scan is between 0V and 0.35V vs Ag/AgCl reference or preferably between −0.25V and 0.1V vs Ag/AgCl reference.

6. A method according to claim 1, wherein detecting the presence of corrosion comprises detecting a pattern in a current response obtained with LSV or CV scan.

7. A method according to claim 1, wherein detecting the presence of corrosion comprises detecting the rate of a current change or the change of the rate of current change, the current being the current response obtained with LSV or CV scan.

8. A method according to claim 7, wherein the rate of the current change is the derivative of the current with respect to time or with respect to potential, the current being the current response to the LSV or CV scan.

9. A method according to claim 7, wherein the change of the rate of the current change is the second derivative of the current with respect to time or with respect to potential, the current being the current response to the LSV or CV scan.

10. A method according to claim 1, wherein the electrolyte is a synthetic physiological fluid.

11. A method according to claim 1, wherein the object is a medical object, such as a medical instrument, clinical instrument or clinical research instrument.

12. A method according to claim 1, wherein detecting the presence of corrosion comprises
determining the current response in a selected potential range,
determining from the current response data used in a machine learning procedure, the machine learning procedure comprising previously gathered data,
classifying the object to a corroded sample or to a clean sample based on the determined data and from the previously gathered data using machine learning.

13. An apparatus for detecting corrosion on surfaces of an object comprising
means for immersing the object into an electrolyte,
means for detecting by electrochemical techniques the presence of corrosion on the surfaces of the object based on current originating from redox reaction of iron, wherein the step of detecting comprises using linear sweep voltammetry (LSV) or cyclic voltammetry (CV) scan and using an Ag or an AgCl reference electrode in the LSV or CV scan as the third electrode, and wherein the potential window for the LCV or CV scan is between −0.35V and 0.35V vs Ag/AgCl reference.

* * * * *